US012123466B2

(12) United States Patent
Hagiwara et al.

(10) Patent No.: US 12,123,466 B2
(45) Date of Patent: Oct. 22, 2024

(54) STAKING APPARATUS AND STAKING METHOD FOR BEARING UNIT, MANUFACTURING METHOD AND MANUFACTURING APPARATUS OF HUB UNIT BEARING, AND MANUFACTURING METHOD OF VEHICLE

(71) Applicant: NSK LTD., Tokyo (JP)

(72) Inventors: Nobuyuki Hagiwara, Fujisawa (JP); Xuexiao Zhao, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/014,453

(22) PCT Filed: May 27, 2021

(86) PCT No.: PCT/JP2021/020149
§ 371 (c)(1),
(2) Date: Jan. 4, 2023

(87) PCT Pub. No.: WO2022/064770
PCT Pub. Date: Mar. 31, 2022

(65) Prior Publication Data
US 2023/0296136 A1 Sep. 21, 2023

(30) Foreign Application Priority Data
Sep. 24, 2020 (JP) ................... 2020-159529

(51) Int. Cl.
*F16C 43/06* (2006.01)
(52) U.S. Cl.
CPC .......... *F16C 43/06* (2013.01); *F16C 2226/00* (2013.01); *F16C 2326/02* (2013.01)

(58) Field of Classification Search
CPC .. F16C 43/06; F16C 2226/00; F16C 2326/02; F16C 2226/52; F16C 19/386;
(Continued)

(56) References Cited

U.S. PATENT DOCUMENTS

| 4,428,105 A | 1/1984 | Abbott et al. |
| 4,559,692 A * | 12/1985 | Morin ................ B23P 15/003 |
| | | 29/243.517 |

(Continued)

FOREIGN PATENT DOCUMENTS

| JP | 2000-343905 A | 12/2000 |
| JP | 2002-160028 A | 6/2002 |

(Continued)

OTHER PUBLICATIONS

International Search Report for PCT/JP2021/020149, dated Aug. 24, 2021.

(Continued)

*Primary Examiner* — Sarang Afzali
*Assistant Examiner* — Darrell C Ford
(74) *Attorney, Agent, or Firm* — Sughrue Mion, PLLC

(57) ABSTRACT

A plurality of press rolls (33) each having an inclined roll central axis (6) are used. Each of press rolls (33) and a bub ring (22z) are relatively rotated while pressing a roll processing surface portion (34) of each of the press rolls (33) against a plurality of locations of a tubular portion (25) of the hub ring (22z) in a circumferential direction to plastically deform the tubular portion (25).

4 Claims, 9 Drawing Sheets

(58) Field of Classification Search
CPC . F16C 33/64; B21H 1/06; B21J 9/025; B21K 1/40; B21K 1/05; B23P 11/005; B23P 15/003; B60B 2310/2082; B60B 27/0084; B21D 39/04; B21D 19/04; Y10T 29/49636; Y10T 29/4968
See application file for complete search history.

(56) References Cited

U.S. PATENT DOCUMENTS

| | | | | |
|---|---|---|---|---|
| 5,946,959 | A | * | 9/1999 | Anderheyden .......... B21J 9/025 72/91 |
| 6,672,123 | B2 | * | 1/2004 | Sczesny .................. B21J 9/025 72/11.1 |
| 2009/0252447 | A1 | * | 10/2009 | Hirai ....................... B60B 27/00 384/513 |
| 2011/0241416 | A1 | | 10/2011 | Kaiser et al. |
| 2017/0363149 | A1 | | 12/2017 | Kaiser et al. |

FOREIGN PATENT DOCUMENTS

| | | |
|---|---|---|
| JP | 2004-162913 A | 6/2004 |
| JP | 2007-263360 A | 10/2007 |
| JP | 2017-019010 A | 1/2017 |

OTHER PUBLICATIONS

The Extended European Search Report for EP 21 84 7672 dated Sep. 22, 2022.

\* cited by examiner

STAKING APPARATUS AND STAKING METHOD FOR BEARING UNIT, MANUFACTURING METHOD AND MANUFACTURING APPARATUS OF HUB UNIT BEARING, AND MANUFACTURING METHOD OF VEHICLE

CROSS REFERENCE TO RELATED APPLICATIONS

This application is a National Stage of International Application No. PCT/JP2021/020149 filed May 27, 2021, claiming priority based on Japanese Patent Application No. 2020-159529 filed Sep. 24, 2020.

TECHNICAL FIELD

The present invention relates to a staking apparatus and a staking method for a bearing unit, a manufacturing method and a manufacturing apparatus of a hub unit bearing, and a manufacturing method of a vehicle, which are for rotatably supporting a wheel of the vehicle such as an automobile with respect to a suspension apparatus.

Priority is claimed on Japanese Patent Application No. 2020-159529, filed Sep. 24, 2020, the content of which is incorporated herein by reference.

BACKGROUND ART

A wheel of an automobile is rotatably supported with respect to a suspension apparatus by a hub unit bearing. A hub unit bearing is known as an example of a bearing unit in which a first member and a second member are combined in an axial direction. In a hub unit bearing, a hub which is an inner ring member is usually formed by combining a plurality of parts including a shaft member and an inner ring fitted on the shaft member. Further, in order to reduce the number of parts constituting a hub, a structure in which a shaft member and an inner ring are connected and fixed to each other with a staking portion formed on the shaft member without using separate parts such as a bolt and a nut has become widespread. Specifically, a tubular portion provided at an end portion of the shaft member on one side in the axial direction is plastically deformed outward in a radial direction to form the staking portion. Then, the staking portion holds down an end surface of the inner ring fitted on the shaft member on one side in the axial direction, and thus the shaft member and the inner ring are coupled and fixed to each other.

Japanese Patent Application, Publication No. 2000-343905 (Patent Literature 1) describes staking as a specific method for forming a staking portion of a shaft member. In this staking, press dies having a central axis inclined with respect to the central axis of a shaft member (a hub main body) are used as a tool. The central axis of the press dies is inclined away from the central axis of the shaft member in the radial direction toward one side in the axial direction of the shaft member, specifically, an inner side in the axial direction which is a central side of a vehicle in a width direction in a state in which a hub unit bearing is assembled to the vehicle. When a staking portion is formed by staking, in a state in which the press dies are pressed against a tubular portion provided at an end portion of the shaft member on one side in the axial direction, the central axis of the press dies is whirled around the central axis of the shaft member like a trajectory of the central axis due to precessional motion. As a result, while a processing force is applied from each of the press dies to a part of the tubular portion in a circumferential direction toward the other side in the axial direction, specifically, toward an outer side in the axial direction which is an outer side of a vehicle in a width direction in a state in which a hub unit bearing is assembled to the vehicle and toward an outer side in the radial direction, a position where the processing force is applied is continuously changed in the circumferential direction of the tubular portion. As a result, the tubular portion is plastically deformed outward in the radial direction to form the staking portion, and the staking portion holds down an end surface of an inner ring on one side in the axial direction.

Since the staking as described above is a processing method in which the tubular portion is gradually plastically deformed while the position of the processing force applied to the tubular portion is continuously changed in the circumferential direction, the processing force for forming the staking portion can be suppressed to be small compared with a processing method in which the tubular portion is simultaneously plastically deformed over the entire circumference. However, in staking like that described above, since the processing force applied to the tubular portion from each of the press dies is a load (an uneven load) acting at a position deviated from the central axis of the shaft member in the radial direction, the force for holding down the end surface of the inner ring on one side in the axial direction with the staking portion may be non-uniform in the circumferential direction.

Japanese Patent Application, Publication No. 2004-162913 (Patent Literature 2) describes a method and an apparatus for stably manufacturing a high-quality hub unit bearing (a rolling bearing unit for supporting a wheel) while reducing the size and cost of the manufacturing apparatus. The manufacturing apparatus described in Japanese Patent Application, Publication No. 2004-162913 includes a support base, a press head, and a press roller. The press head has a roller holding portion on a tip end surface (a lower surface) thereof and is configured to be able to rotate around its own central axis that coincides with the central axis of a shaft member (a hub main body) placed on an upper surface of the support base. The press roller is rotatably supported inside the roller holding portion around its own central axis in a state in which its own central axis is disposed in a radial direction of the press head. Specifically, the press roller has a processing portion having a recess on an outer peripheral surface thereof and a pair of pivots coaxially projecting from both end surfaces of the processing portion in the axial direction, and each of the pivots is rotatably supported with respect to the press head by a radial bearing.

When the staking portion is formed by the manufacturing apparatus described in Japanese Patent Application, Publication No. 2004-162913, the press head is lowered to cause the recess of the press roller to come into contact with the tubular portion (a cylindrical portion) of the shaft member (the hub main body), and then the press head is rotated while being pressed downward. As a result, the tubular portion is plastically deformed outward in the radial direction to form the staking portion.

In the manufacturing apparatus described in Japanese Patent Application, Publication No. 2004-162913, the radius of curvature of the press roller that presses the tubular portion or the staking portion of the shaft member can be reduced, and the contact area between the tubular portion or the staking portion and the press roller can be reduced to locally plastically deform the tubular portion or the staking portion. Therefore, the force for pressing the press head can be reduced, the manufacturing apparatus can be miniaturized, and the deformation of the shaft member and the inner ring during manufacturing can be suppressed, so that a good quality hub unit bearing can be obtained.

In such a manufacturing apparatus, if a plurality of press rollers are disposed at a tip end portion of the press head at equal intervals in a rotation direction of the press head, processing forces that are symmetrical about the central axis of the shaft member can be applied to the shaft member when the staking portion is formed. In other words, it is possible to prevent the resultant force of these processing forces from becoming an eccentric load. Therefore, the force for holding down the end surface of the inner ring on one side in the axial direction with the staking portion can be made uniform in the circumferential direction, and the quality of the hub unit bearing can be improved.

CITATION LIST

Patent Literature

Patent Literature 1

Japanese Patent Application, Publication No. 2000-343905

Patent Literature 2

Japanese Patent Application, Publication No. 2004-162913

SUMMARY OF INVENTION

Technical Problem

However, in the manufacturing apparatus described in Japanese Patent Application, Publication No. 2004-162913, it is difficult to increase an outer diameter dimension of the press roller, and it is difficult to secure strength of the press roller. In addition, since a space of a portion of the press head which supports the pair of pivots of the press roller via the radial bearing is limited, it is difficult to employ a bearing with a large load capacity as the radial bearing, and thus a degree of freedom in design may be restricted.

An object of the present invention is to provide a staking apparatus and a staking method for a bearing unit, a manufacturing method and a manufacturing apparatus of a hub unit bearing, and a manufacturing method of a vehicle, which are advantageous for improving quality.

Solution to Problem

In an aspect of the present invention, a staking apparatus for a bearing unit includes: a reference axis; a base that supports a bearing unit in which a first member and a second member are combined in an axial direction; a first press die that has a first rotation axis; and a second press die that has a second rotation axis and is disposed apart from the first press die in a circumferential direction around the reference axis, wherein the first press die disposed such that the first rotation axis is inclined with respect to the reference axis and the second press die disposed such that the second rotation axis is inclined with respect to the reference axis are pressed against the bearing unit.

In an aspect of the present invention, a staking method for a bearing unit includes: a step of preparing a first press die that has a first rotation axis, and a second press die that has a second rotation axis and is disposed apart from the first press die in a circumferential direction around a reference axis; a step of supporting a bearing unit in which a first member and a second member are combined in an axial direction on a base; and a step of pressing the first press die disposed such that the first rotation axis is inclined with respect to the reference axis and the second press die disposed such that the second rotation axis is inclined with respect to the reference axis against the bearing unit.

In an aspect of the present invention, a hub unit bearing which is a target includes a shaft member and an inner ring fitted on the shaft member and in which an end surface of the inner ring on one side in an axial direction is held down with a staking portion formed by plastically deforming a tubular portion provided at an end portion of the shaft member on one side in an axial direction.

Specifically, such a hub unit bearing includes, for example, an outer ring having double-row outer ring races on an inner peripheral surface thereof, a hub having double-row inner ring races on an outer peripheral surface thereof, and a plurality of rolling elements rotatably disposed between the double-row outer ring races and the double-row inner ring races for each row.

The hub includes an inner ring and a hub ring which is a shaft member.

The inner ring has an inner ring race on one side in the axial direction of the double-row inner ring races on an outer peripheral surface thereof.

The hub ring includes an inner ring race of the double-row inner ring races on the other side in the axial direction which is provided on an outer peripheral surface of an axially intermediate portion directly or via other members, a fitting shaft portion which is on one side in the axial direction with respect to an inner ring race on the other side in the axial direction and on which the inner ring is fitted, and a staking portion which is formed by plastically deforming a tubular portion that extends from an end portion of the fitting shaft portion on one side in the axial direction toward one side in the axial direction outward in the radial direction to hold down an end surface of the inner ring on one side in the axial direction.

That is, the staking portion is bent toward the outer side in the radial direction from an end portion of the fitting shaft portion on the inner side in the axial direction to hold down an end surface of the inner ring on the one side in the axial direction.

In an aspect of the present invention, in the manufacturing method of a hub unit bearing, a plurality of press rolls which are disposed apart from each other in a circumferential direction about a central axis of the shaft member, each have a roll central axis inclined away from the central axis of the shaft member in a radial direction of the shaft member from one side toward the other side in the axial direction of the shaft member and an annular roll processing surface portion centered on the roll central axis, and are supported to freely rotate about the roll central axis are used.

Further, the method comprises a step of plastically deforming the tubular portion by relatively rotating each of the press rolls and the shaft member about the central axis of the shaft member while pressing the roll processing surface portion of each of the press rolls against a plurality of locations of the tubular portion in the circumferential direction.

In an example, the plurality of press rolls are disposed at equal intervals in the circumferential direction about the central axis of the shaft member.

In an example, the step includes a first step and a second step.

In the first step, while a processing force is applied from the roll processing surface portion of each of the press rolls to each of the plurality of locations of the tubular portion in the circumferential direction toward the other side in the axial direction of the shaft member and toward an outer side in the radial direction of the shaft member, a position where the processing force is applied is continuously changed in the circumferential direction of the tubular portion on the basis of the relative rotation, and the tubular portion is plastically deformed to be expanded toward the outer side in the radial direction while being crushed in the axial direction and to form a staking portion intermediary body.

In the second step, while a processing force is applied from the roll processing surface portion of each of the press rolls to each of the plurality of locations of the staking portion intermediary body in the circumferential direction toward the other side in the axial direction of the shaft member and toward an inner side in the radial direction of the shaft member, a position where the processing force is applied is continuously changed in the circumferential direction of the staking portion intermediary body on the basis of the relative rotation, and the staking portion intermediary body is plastically deformed to be pressed toward the inner side in the radial direction while being crushed in the axial direction and to form the staking portion.

In an example, a position of the press roll in an axial direction of the roll central axis in the second step is disposed to be shifted closer to the central axis of the shaft member than a position of the press roll in the axial direction of the roll central axis in the first step.

In an example, an inclination angle of the roll central axis with respect to the central axis of the shaft member in the second step is smaller than an inclination angle of the roll central axis with respect to the central axis of the shaft member in the first step.

In an example, a time point at which the first step ends is determined using a value of a torque for relatively rotating each of the press rolls and the shaft member about the central axis of the shaft member.

In an aspect of the present invention, a manufacturing apparatus of a hub unit bearing includes: a support base; a plurality of press rolls; and a drive mechanism.

The support base is for supporting the shaft member.

The plurality of press rolls are disposed apart from each other in a circumferential direction about a central axis of the shaft member supported by the support base.

Each of the press rolls has a roll central axis inclined away from the central axis of the shaft member in a radial direction of the shaft member from one side toward the other side in the axial direction of the shaft member supported by the support base and an annular roll processing surface portion centered on the roll central axis and is supported to freely rotate about the roll central axis.

The drive mechanism has a function of plastically deforming the tubular portion by relatively rotating each of the press rolls and the shaft member about the central axis of the shaft member while pressing the roll processing surface portion of each of the press rolls against a plurality of locations of the tubular portion in the circumferential direction.

In an example, the plurality of press rolls are disposed at equal intervals in the circumferential direction about the central axis of the shaft member.

In an example, each of the press rolls has a roll main body having the roll processing surface portion on an outer peripheral surface thereof and a pair of support shaft portions protruding from a radially central portion of the roll main body toward both sides in an axial direction of the roll main body and disposed coaxially with the roll central axis, and each of the pair of support shaft portions is supported to freely rotate about the roll central axis.

In an example, the drive mechanism revolves each of the press rolls about the central axis of the shaft member to relatively rotate each of the press rolls and the shaft member about the central axis of the shaft member.

In an example, the drive mechanism rotates the shaft member about the central axis of the shaft member to relatively rotate each of the press rolls and the shaft member about the central axis of the shaft member.

In an aspect of the present invention, the vehicle to be manufactured includes a hub unit bearing.

In an aspect of the present invention, in a manufacturing method of a vehicle, the hub unit bearing is manufactured using the staking method or the manufacturing method of a hub unit bearing.

Advantageous Effects of Invention

According to the aspects of the present invention, there are provided a staking apparatus and a staking method for a bearing unit, a manufacturing method and a manufacturing apparatus of a hub unit bearing, and a manufacturing method of a vehicle, which are advantageous for improving quality.

DESCRIPTION OF EMBODIMENTS

First Embodiment

An embodiment of the present invention will be described with reference to FIGS. 1 to 4.

(Hub Unit Bearing)

Figure 1:
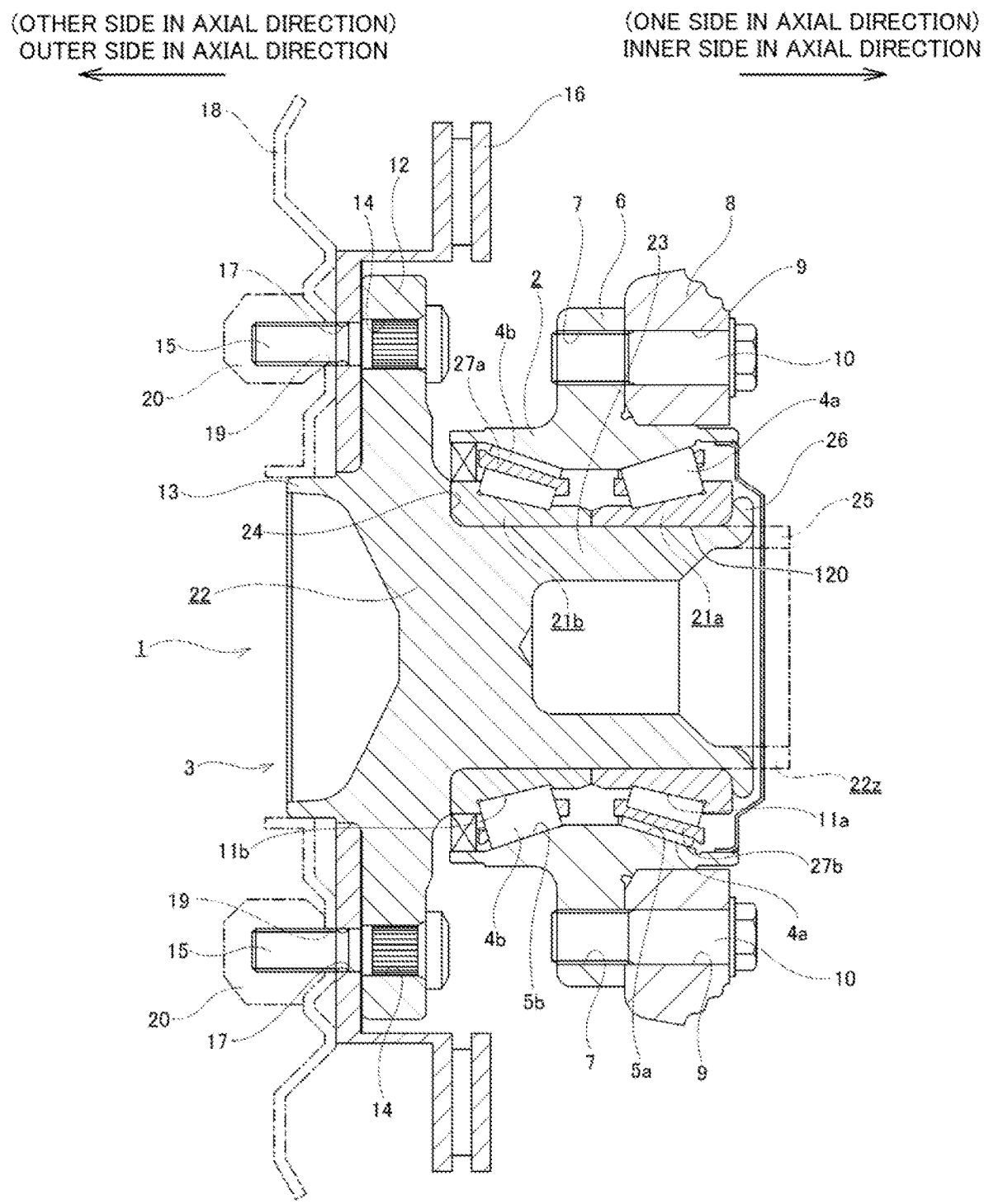
FIG. 1 is a cross-sectional view showing a state in which a hub unit bearing is assembled to a vehicle.

FIG. 1 shows a hub unit bearing (an example of a bearing unit, a staking assembly, a staking unit) 1 to be manufactured. The hub unit bearing 1 is for a driven wheel and includes an outer ring 2, a hub 3, and a plurality of rolling elements 4a and 4b.

Regarding the hub unit bearing 1, an inner side in an axial direction is a right side in FIG. 1 which is a central side of a vehicle in a width direction in a state in which the hub unit bearing 1 is assembled to the vehicle. An outer side in the axial direction is a left side in FIG. 1 which is an outer side of the vehicle in the width direction in a state in which the hub unit bearing 1 is assembled to the vehicle. Further, in the present example, regarding the hub unit bearing 1, the inner side in the axial direction corresponds to one side in the axial direction, and the outer side in the axial direction corresponds to the other side in the axial direction.

The outer ring 2 includes double-row outer ring races 5a and 5b and a stationary flange 6. In an example, the outer ring races 5a and 5b and the stationary flange 6 are made of a hard metal such as medium carbon steel. In another example, the outer ring races 5a and 5b and the stationary flange 6 can be made of different materials. The double-row outer ring races 5a and 5b are provided on an inner peripheral surface of an axially intermediate portion of the outer ring 2 and are constituted by conical concave surfaces that are inclined in a direction in which diameters increase away from each other in the axial direction. The stationary flange 6 protrudes from the axially intermediate portion of the outer ring 2 toward the outer side in the radial direction and has support holes 7 constituted by screw holes at a plurality of locations in a circumferential direction.

When a bolt 10 inserted into a through hole 9 of a knuckle 8 constituting a suspension apparatus of the vehicle is screwed and fastened into the support holes 7 of the stationary flange 6 from the inner side in the axial direction, the outer ring 2 is supported and fixed to the knuckle 8.

The hub (the bearing unit, the staking assembly, the staking unit) 3 is disposed coaxially with the outer ring 2 on the inner side of the outer ring 2 in a radial direction. The hub 3 includes double-row inner ring races 11a and 11b, a rotation flange 12, and a pilot portion 13. The double-row inner ring races 11a and 11b are provided in a portion on an outer peripheral surface (an outer surface) of the hub 3 facing the double-row outer ring races 5a and 5b and are constituted by conical convex surfaces that are inclined in a direction in which diameters increase away from each other in the axial direction. The rotation flange 12 protrudes from a portion of the hub 3 located at an outer side in the axial direction with respect to the outer ring 2 toward the outer side in the radial direction and has attachment holes 14 at a plurality of locations in the circumferential direction. The pilot portion 13 is provided at an end portion of the hub 3 on the outer side in the axial direction and is formed in a cylindrical shape.

In an example, a stud 15 is press-fitted into each of the attachment holes 14 from the inner side in the axial direction. In a state in which the pilot portion 13 is inserted into a central hole provided in a central portion of a rotation body 16 for braking such as a disk or a drum and a wheel 18 which is a wheel of the vehicle and the stud 15 is inserted into each of through holes 17 and 19 provided at a plurality of locations of radially intermediate portions of the rotation body 16 and the wheel 18 in the circumferential direction, a nut 20 is screwed onto a tip end portion of the stud 15, and thus the rotation body 16 and the wheel 18 are coupled to the rotation flange 12.

In the present example, the hub 3 (the bearing unit, the staking assembly, the staking unit) is formed by combining an inner side inner ring 21a (a first member) corresponding to an inner ring, an outer side inner ring 21b (a first member), and a hub ring (a hub main body, a second member) 22 corresponding to a shaft member. The hub (the bearing unit, the staking assembly) 3 is substantially formed by combining the hub ring 22 and the inner rings 21a and 21b in the axial direction. The hub 3 has the hub ring 22 having an outer peripheral surface (an outer surface) and the inner rings 21a and 21b disposed on the outer peripheral surface (the outer surface) of the hub ring 22 and held by the hub ring 22.

In an example, each of the inner side inner ring 21a and the outer side inner ring 21b is made of a hard metal such as bearing steel and is formed in a tubular shape as a whole. In another example, the inner side inner ring 21a and the outer side inner ring 21b can be made of other materials. The inner side inner ring 21a has the inner ring race 11a on the inner side in the axial direction on the outer peripheral surface thereof. The outer side inner ring 21b has the inner ring race 11b on the outer side in the axial direction on the outer peripheral surface thereof.

In an example, the hub ring 22 is made of a hard metal such as medium carbon steel, has the rotation flange 12 protruding toward the outer side in the radial direction from an axially outer side portion, and has the cylindrical pilot portion 13 at the end portion on the outer side in the axial direction. In another example, the hub ring 22 can be made of other materials. Further, the hub ring 22 has a fitting shaft portion 23 on which the inner side inner ring 21a and the outer side inner ring 21b are fitted in a portion located at an inner side in the axial direction with respect to the rotation flange 12. Further, the hub ring 22 has a stepped surface 24 that is bent at a right angle toward the outer side in the radial direction from an end portion of an outer peripheral surface of the fitting shaft portion 23 on the outer side in the axial direction and faces the inner side in the axial direction. An end surface of the outer side inner ring 21b on the outer side in the axial direction is in contact with the stepped surface 24. An end surface of the inner side inner ring 21a on the outer side in the axial direction is in contact with the end surface of the outer side inner ring 21b on the inner side in the axial direction. Further, the hub ring 22 has a staking portion 26 that is bent toward the outer side in the radial direction from an end portion of the fitting shaft portion 23 on the inner side in the axial direction to hold down an end surface of the inner side inner ring 21a on the inner side in the axial direction. In an example, the hub ring has the staking portion 26 (the staking portion 26 for holding the inner rings 21a and 21b) with respect to the inner rings 21a and 21b. The hub ring 22 is inserted into holes 120 of the inner rings 21a and 21b. The staking portion 26 that has a bend extending in the circumferential direction and covers the end portion of the inner ring 21a in the axial direction is provided in a peripheral wall of the hub ring 22.

That is, in the present example, in a state in which the inner side inner ring 21a and the outer side inner ring 21b are fitted on the outer peripheral surface of the fitting shaft portion 23 of the hub ring 22, the inner side inner ring 21a and the outer side inner ring 21b are interposed between the stepped surface 24 and an axially outer side surface of the staking portion 26 from both sides in the axial direction, the inner side inner ring 21a, the outer side inner ring 21b, and the hub ring 22 are coupled and fixed to each other, and thus the hub 3 is formed. In a case in which the present invention is carried out, it is also possible to manufacture the hub unit bearing in which the inner ring race on the outer side in the axial direction is directly provided on the outer peripheral surface of the axially intermediate portion of the hub ring corresponding to the shaft member.

In an example, the rolling elements 4a and 4b are each made of a hard metal such as bearing steel or ceramics, and a plurality of the rolling elements 4a and 4b are disposed between the double-row outer ring races 5a and 5b and the double-row inner ring races 11a and 11b for each row. In another example, the rolling elements 4a and 4b can be made of other materials. The rolling elements 4a and 4b are rotatably held by retainers 27a and 27b for each row. In the illustrated example, conical rollers are used as the rolling elements 4a and 4b, but balls may also be used. Further, in a structure of the present example, a preload in an appropriate range is applied to the rolling elements 4a and 4b in a state in which the end surface of the inner side inner ring 21a on the inner side in the axial direction is held down with the staking portion 26.

(Manufacturing Method of Hub Unit Bearing)

Figure 3:
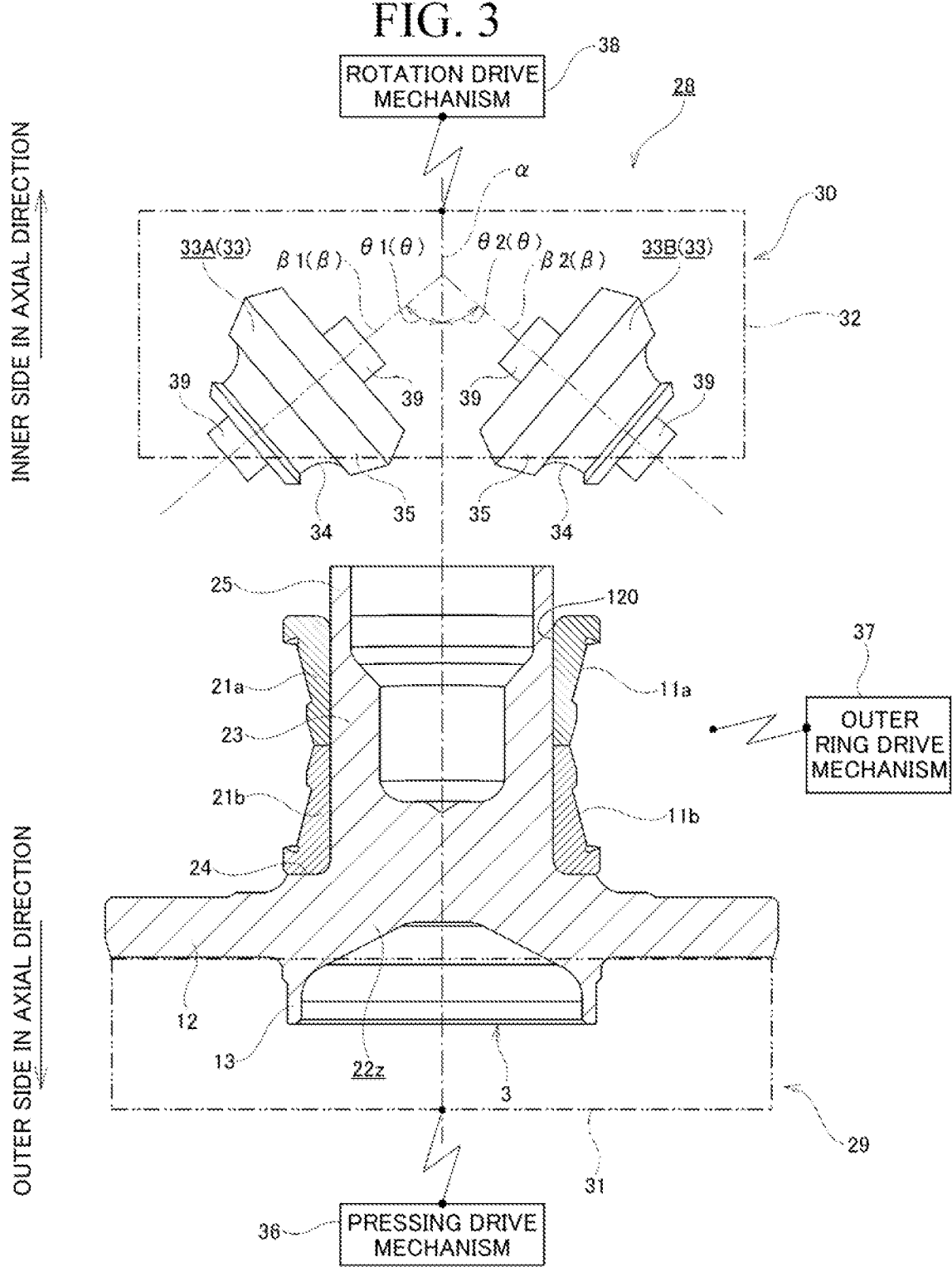
FIG. 3 is a partial cross-sectional view showing a state before a step of forming a staking portion starts.

The hub unit bearing 1 of the present example is manufactured as follows. First, a metal material is subjected to necessary processing such as forging and grinding and is further subjected to finishing such as polishing, and thus a hub ring 22z before the staking portion 26 is formed as shown in FIG. 3 is manufactured. The hub ring 22z has a cylindrical tubular portion 25 at an end portion on the inner side in the axial direction. In other words, the hub ring 22z has the cylindrical tubular portion 25 extending toward the inner side in the axial direction from the end portion of the fitting shaft portion 23 on the inner side in the axial direction.

Figure 2:
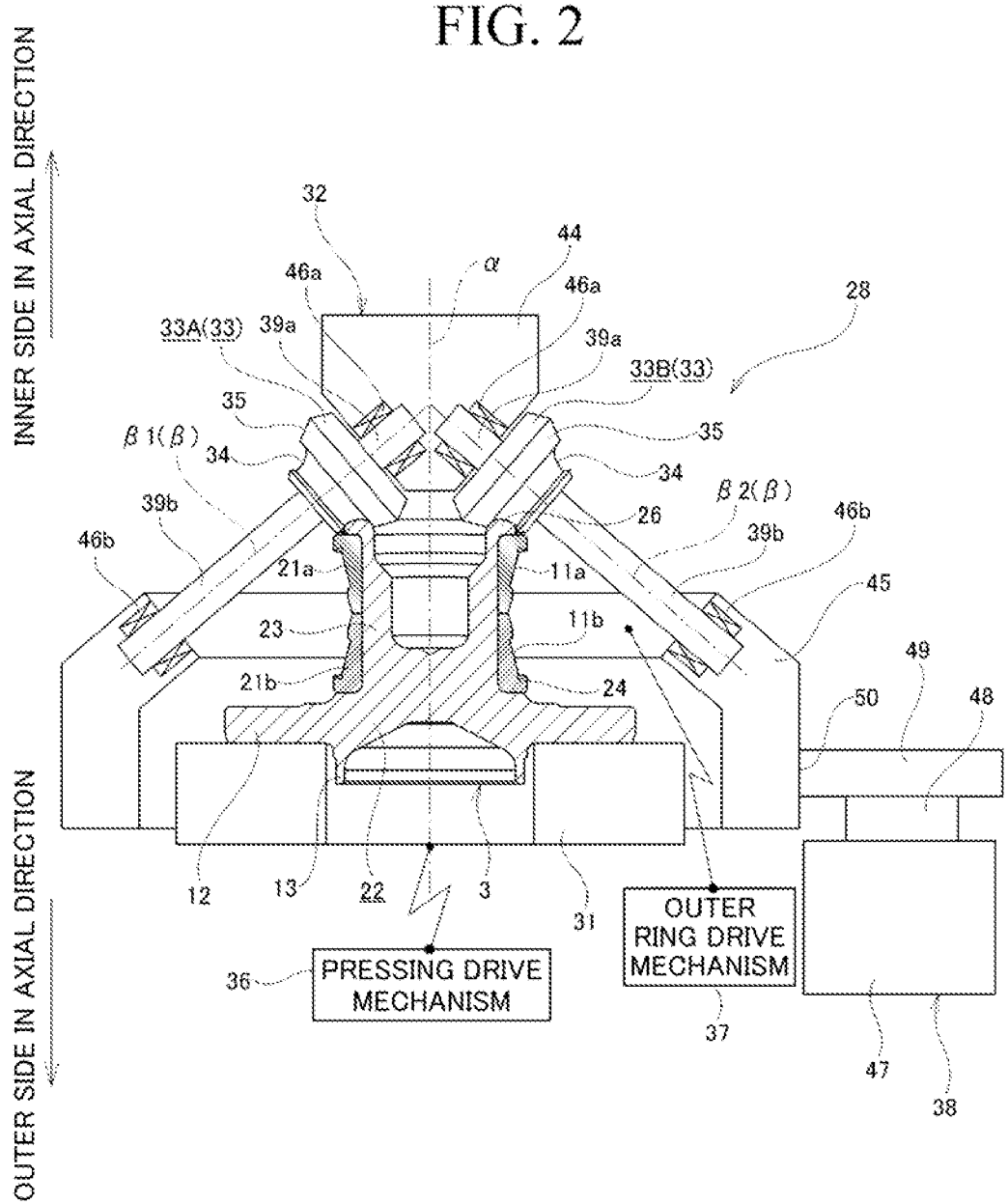
FIG. 2 is a cross-sectional view schematically showing a usage state of a manufacturing apparatus of hub unit bearing in an embodiment.
Figure 4:
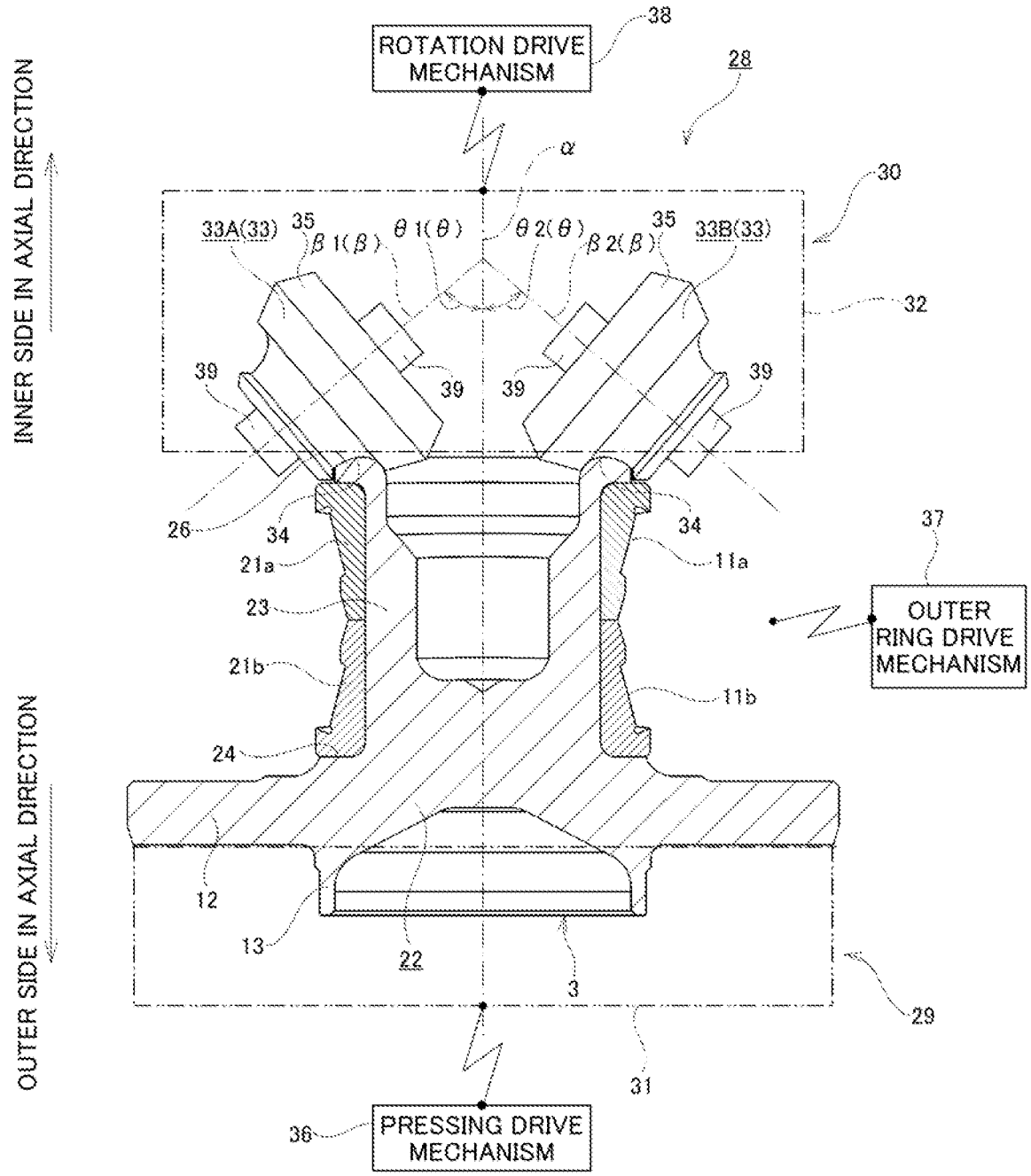
FIG. 4 is a partial cross-sectional view showing a state when a step of forming the staking portion ends.

Next, the rolling element 4a in an axially inner side row is disposed on an inner diameter side of the outer ring race 5a of the outer ring 2 on the inner side in the axial direction in a state in which the rolling element 4a is held by the retainer 27a on the inner side in the axial direction, and the rolling element 4b in an axially outer side row is disposed on an inner diameter side of the outer ring race 5b of the outer ring 2 on the outer side in the axial direction in a state in which the rolling element 4b is held by the retainer 27b on the outer side in the axial direction. Next, the inner side inner ring 21a is inserted into the inner diameter side of the outer ring 2 from the inner side in the axial direction and the outer side inner ring 21b is inserted into the inner diameter side of the outer ring 2 from the outer side in the axial direction. Next, the inner side inner ring 21a and the outer side inner ring 21b are fitted on the outer peripheral surface of the fitting shaft portion 23 of the hub ring 22z in a state in which the end surfaces thereof in the axial directions facing each other are in contact with each other, and the end surface of the outer side inner ring 21b on the outer side in the axial direction is brought into contact with the stepped surface 24 of the hub ring 22z. As a result, the hub unit bearing before the staking portion 26 is formed is assembled. Such a procedure for assembling the hub unit bearing before the staking portion 26 is formed can be appropriately changed as long as there is no contradiction. In FIGS. 2 to 4, the outer ring 2, the rolling elements 4a and 4b, and the retainers 27a and 27b are not shown.

Next, the staking portion 26 is formed by plastically working the tubular portion 25 of the hub ring 22z using a hub unit bearing manufacturing apparatus (a staking apparatus) 28 of the present example shown in FIGS. 2 to 4. That is, in the manufacturing method of a hub unit bearing of the present example, a plurality of press rolls (staking dies, press dies, press die units) 33 constituting a manufacturing apparatus 28 are used, and the manufacturing method includes a step of relatively rotating each of the press rolls 33 and the hub ring 22z which is the shaft member about a reference axis α (a central axis α of the hub ring 22z) while pressing a roll processing surface portion 34 of each of the press rolls 33 against a plurality of locations of the tubular portion 25 in the circumferential direction to plastically deform the tubular portion 25.

The manufacturing apparatus 28 includes the reference axis α, a support base 31, the plurality of press rolls 33, and a drive mechanism. In the present example, the drive mechanism is constituted by a pressing drive mechanism 36 that constitutes a workpiece-side device 29 and a rotation drive mechanism 38 that constitutes a tool-side device 30. Such a manufacturing apparatus 28 will be specifically described below.

The manufacturing apparatus 28 includes the workpiece-side device (a first device) 29 and the tool-side device (a second device) 30. In a case in which the present invention is carried out, a vertical direction in FIGS. 2 to 4 is not necessarily an actual vertical direction. Further, in FIGS. 3 and 4, the illustration of a part of the manufacturing apparatus 28 shown in FIG. 2 is omitted or simplified.

The workpiece-side device 29 includes the support base 31, the pressing drive mechanism 36, and an outer ring drive mechanism 37.

The support base 31 can support the hub ring 22z in a state in which the hub ring 22z is prevented from being displaced toward the outer side in the axial direction. Specifically, as shown in FIGS. 2 to 4, the support base 31 can support the axially outer side portion (a lower portion in FIGS. 2 to 4) of the hub ring 22z (22) in a state in which an axially inner side portion of the hub ring 22z (22) faces upward.

The pressing drive mechanism 36 is a mechanism (a hydraulic mechanism) that uses a hydraulic pump as a drive source and moves the support base 31 in the axial direction of the hub ring 22z (22) (the vertical direction in FIGS. 2 to 4). Therefore, the pressing drive mechanism 36 can move the hub ring 22z (22) supported by the support base 31 in the axial direction of the hub ring 22z (22).

The outer ring drive mechanism 37 is, for example, a mechanism that uses an electric motor as a drive source and rotates the outer ring 2 (see FIG. 1), which is not shown in FIGS. 2 to 4, with respect to the hub ring 22z (22).

The tool-side device 30 includes a roll head 32, the plurality of press rolls 33, and the rotation drive mechanism 38.

The roll head 32 is supported with respect to a housing (not shown) to be able to rotate about the central axis α in a state in which the reference axis α is disposed coaxially with the central axis α of the hub ring 22z (22) supported by the support base 31.

In the present example, as shown in FIG. 2, the roll head 32 is configured to include a first head 44 and a second head 45 disposed apart from each other. In the illustrated example, the first head 44 is formed in a block shape having a substantially wedged cross-sectional shape and is supported with respect to a housing (not shown) to be able to rotate about the central axis α in a state in which the reference axis α is disposed coaxially with the central axis α of the hub ring 22z (22) supported by the support base 31. The second head 45 is formed in an annular shape as a whole, is disposed on the outer side in the axial direction of the hub ring 22z (22) with respect to the first head 44, and is disposed coaxially with the central axis α of the hub ring 22z (22). Further, the second head 45 is supported with respect to the housing to be able to rotate about the central axis α of the hub ring 22z (22) in synchronization with the first head 44. In order to rotate the first head 44 and the second head 45 in synchronization with each other, the first head 44 and the second head 45 may be connected by a connecting member (not shown). Further, in the present example, the second head 45 is provided with a driven gear 50 on an outer peripheral surface of an axially outer side portion thereof.

The plurality of press rolls 33 are supported by the roll head 32 and are disposed apart from each other in the circumferential direction about the central axis α of the hub ring 22z (22) supported by the support base 31. In the present example, the number of press rolls 33 is two and includes a first roller (a first press die) 33A and a second roller (a second press die) 33B. Further, the two press rolls 33 are disposed apart from each other, preferably, at equal intervals, in the circumferential direction about the central axis α of the hub ring 22z (22). That is, the two press rolls 33 are disposed at two locations, preferably two locations at equal intervals, in the circumferential direction about the central axis α of the hub ring 22z (22). In the present example, in other words, the two press rolls 33 are disposed at two locations on opposite sides in a diameter direction about the reference axis α (the central axis α of the hub ring 22z (22)).

In a case in which the present invention is carried out, the number of press rolls 33 may be 3, 4, 5, 6, 7, 8, 9, or 10 or more. Further, in a case in which the present invention is carried out, it is not always necessary to dispose a plurality of press rolls at equal intervals in the circumferential direction about the central axis of the shaft member. However, it is preferable to dispose the plurality of press rolls such that processing forces that are symmetrical about the central axis α of the hub ring 22z (22) are applied to the hub ring 22z (22), for example, to dispose the plurality of press rolls at equal intervals in the circumferential direction as in the present example, when the staking portion 26 is formed.

Each of the of press rolls 33 has a roll central axis β inclined away from the central axis α of the hub ring 22z (22) in the radial direction of the hub ring 22z (22) from the inner side which is one side toward the outer side which is the other side in the axial direction of the hub ring 22z (22) and the annular roll processing surface portion 34 centered on the roll central axis β.

More specifically, each of the press rolls 33 has a substantially truncated cone-shaped roll main body 35 having the roll processing surface portion 34 on the outer peripheral surface thereof and a pair of columnar support shaft portions 39a and 39b protruding from a radially central portion of the roll main body 35 toward both sides in an axial direction of the roll main body 35 and disposed coaxially with the roll central axis β.

The roll processing surface portion 34 is provided on the outer peripheral surface of the roll main body 35 over the entire circumference and is constituted by an inner surface of an annular recess having a substantially arc-shaped generatrix shape (a cross-sectional shape).

In the present example, as shown in FIG. 2, between the pair of support shaft portions 39a and 39b, compared with an axial dimension of one support shaft portion 39a which is closer to the central shaft α of the hub ring 22z (22) in the radial direction of the central shaft a, an axial dimension of the other support shaft portion 39b which is farther from the central axis α of the hub ring 22z (22) in the radial direction of the central axis α is larger. The one support shaft portion 39a is only rotatably supported with respect to the first head 44 by a bearing 46a such as a rolling bearing and a sliding bearing. The other support shaft portion 39a is only rotatably supported with respect to the second head 45 by a bearing 46b such as a rolling bearing and a slide bearing. As a result, each of the press rolls 33 is supported to freely rotate, that is, to freely revolve on its axis, with respect to the roll head 32 about the roll central axis β.

An inclination angle θ of the roll central axis β with respect to the central axis α of the hub ring 22z (22) (an angle on an acute angle side of angles formed between the central axis α and the roll central axis β) can be set to an appropriate magnitude in a range larger than 0° and smaller than 90°. For example, 0 can be set to about 10, 15, 20, 25, 30, 35, 40, 45, 50, 55, 60, 65, 70, 75, 80, or 85. For example, 0 is preferably 30° or more and 60° or less and more preferably 45° or more and 60° or less.

The manufacturing apparatus 28 includes the reference shaft α, the support base (a base) 31, the first roller (the first press die) 33A that has a first rotation axis β1, and the second roller (the second press die) 33B that has a second rotation axis β2 and is disposed apart from the first roller (the first press die) 33A in the circumferential direction around the reference axis α. In the manufacturing apparatus 28, the first roller 33A disposed such that the first rotation axis β1 is inclined with respect to the reference axis α and the second roller 33B disposed such that the second rotation axis β2 is inclined with respect to the reference axis α are configured to be pressed against the hub ring (the bearing unit) 22z (22) at the same time. Further, the manufacturing apparatus 28 is configured such that the first roller 33A and the second roller 33B move around the reference axis α at the same time. For example, the first rotation axis β1 and the second rotation axis β2 have an axisymmetric relationship with respect to the reference axis α. An inclination angle θ1 of the first rotation axis β1 with respect to the reference axis α can be substantially the same as an inclination angle θ2 of the second rotation axis β2 with respect to the reference axis α. Alternatively, the manufacturing apparatus 28 includes the reference shaft α, the support base (a base) 31, the first roller (the first press die) 33A that has a first rotation axis β1, the second roller (the second press die) 33B that has a second rotation axis β2 and is disposed apart from the first roller (the first press die) 33A in the circumferential direction around the reference axis α, and a third roller (a third press die) that has a third rotation axis and is disposed apart from the first roller 33A and the second roller 33B in the circumferential direction. In the manufacturing apparatus 28, the first roller 33A disposed such that the first rotation axis 1 is inclined with respect to the reference axis α, the second roller 33B disposed such that the second rotation axis β2 is inclined with respect to the reference axis α, and the third roller (the third press die) disposed such that the third rotation axis is inclined with respect to the reference axis α are pressed against the hub ring (the bearing unit) 22z (22) at the same time.

A cross-sectional shape (a width direction dimension, a depth, or the like) and a diameter of the roll processing surface portion 34A is made appropriate such that the staking portion 26 can be processed and a portion of the outer peripheral surface of the press roll 33 which should not come into contact with the tubular portion 25 (the staking portion 26) does not inadvertently come into contact (interfere) with the tubular portion 25 (the staking portion 26) while the staking portion 26 is processed. Specifically, for example, the cross-sectional shape of the roll processing surface portion 34 can be made in a single arc shape or a composite curve formed by combining a plurality of arcs. In any case, the cross-sectional shape and the diameter of the roll processing surface portion 34 are determined in design by experiments, simulations, or the like.

In the outer peripheral surface of the press roll 33, portions other than the roll processing surface portion 34 are made in an appropriate shape not to inadvertently interfere with the tubular portion 25 (the staking portion 26) while the staking portion 26 is processed.

In the present example, the rotation drive mechanism 38 is a mechanism that uses an electric motor 47 as a drive source and rotationally drives the roll head 32 about the central axis α of the hub ring 22z (22). In the present example, the electric motor 47 is disposed on the outer side in the axial direction of the hub ring 22z (22) with respect to the two press rolls 33. In the illustrated example, a drive gear 49 fixed to an output shaft 48 of the electric motor 47 is meshed with the driven gear 50 of the second head 45. As a result, the roll head 32 can be rotationally driven with a rotational driving force generated by the electric motor 47. Therefore, the rotation drive mechanism 38 can rotate, that is, revolve, a plurality of press rolls 33 supported by the roll head 32 about the central axis α of the hub ring 22z (22).

In a case in which the present invention is carried out, a location where the electric motor constituting the rotation drive mechanism is installed is not particularly limited. That is, for example, the electric motor can be disposed on the inner side in the axial direction of the hub ring 22z (22) with respect to the plurality of press rolls 33, or can be disposed on the outer side in the axial direction of the hub ring 22z (22) with respect to the plurality of press rolls 33.

In the present example, the outer ring drive mechanism 37 and the rotation drive mechanism 38 are provided separately. However, in a case in which the present invention is carried out, for example, it is also possible to employ a configuration in which the roll head constituting the rotation drive mechanism is connected to the outer ring 2 to rotate the outer ring 2 integrally with the roll head, that is, a configuration in which the rotation drive mechanism has a function of the outer ring drive mechanism, instead of the configuration in which the outer ring drive mechanism is separately provided from the rotation drive mechanism.

When the staking portion 26 is formed using the manufacturing apparatus 28 as described above, first, as shown in FIG. 3, the support base 31 supports the axially outer side portion (the lower portion) of the hub ring 22z in a state in which the axially inner side portion of the hub ring 22z faces upward. Next, the outer ring drive mechanism 37 rotationally drives the outer ring 2 with respect to the hub ring 22z, and the rotation drive mechanism 38 rotates, that is, revolves (moves in the circumferential direction), the roll head 32 and the press roll 33 with respect to the hub ring 22z about the central axis α of the hub ring 22z. Then, in this state, the pressing drive mechanism 36 moves the support base 31 and the hub ring 22z toward the inner side (upward) in the axial direction, and thus the roll processing surface portions 34 of each of the press rolls 33 is pressed against two locations of the tubular portion 25 of the hub ring 22z at equal intervals in the circumferential direction. Then, each of the press rolls 33 is rotated, that is, is revolved on its axis, about the roll central axis β with the frictional force acting on a contact portion between the roll processing surface portion 34 and the tubular portion 25. That is, in a state in which the roll processing surface portion 34 of each of the press rolls 33 is pressed against the two locations of the tubular portion 25 of the hub ring 22z at equal intervals in the circumferential direction, each of the press rolls 33 is revolved on its axis about the roll central axis β while each of the press rolls 33 is revolved about the central axis α of the hub ring 22z. As a result, while the processing force is applied from the roll processing surface portion 34 of each of the press rolls 33 to each of the two locations of the tubular portion 25 at equal intervals in the circumferential direction toward the outer side (a lower side) in the axial direction and toward the outer side in the radial direction, a position where the processing force is applied is continuously changed in the circumferential direction of the tubular portion 25. A load including a load component that is directed outward in the radial direction is applied to the tubular portion 25 using the press rolls 33 (the first roller 33A, the first roller 33B), and a position where the load is applied moves in the circumferential direction. As a result, as shown in FIGS. 3 and 4, the tubular portion 25 is plastically deformed to be expanded toward the outer side in the radial direction while being crushed in the axial direction and to form the staking portion 26.

In the present example, a configuration in which the workpiece-side device 29 includes the pressing drive mechanism 36 that generates a force for pressing the roll processing surface portion 34 of each of the press rolls 33 against the tubular portion 25 is employed, but in a case in which the present invention is carried out, it is also possible to employ a configuration in which the tool-side device includes the pressing drive mechanism.

In the hub unit bearing manufacturing apparatus 28 of the present example as described above, when the staking portion 26 is formed, processing forces that are symmetrical about the central axis of the hub ring 22z can be applied from the two press rolls 33 to the two locations of the tubular portion 25 at equal intervals in the circumferential direction. In other words, it is possible to prevent the resultant force of these processing forces from becoming an eccentric load. Therefore, the force for holding down the end surface of the inner side inner ring 21a on the inner side in the axial direction with the staking portion 26 can be made uniform in the circumferential direction, and it is easy to sufficiently secure the quality of the hub unit bearing 1.

Further, in the hub unit bearing manufacturing apparatus 28 of the present example, the roll central axis β of each of the two press rolls 33 is inclined away from the central axis α of the hub ring 22z in the radial direction of the hub ring 22z from the inner side toward the outer side in the axial direction of the hub ring 22z. Therefore, as compared with the press roller of the manufacturing apparatus described in Japanese Patent Application, Publication No. 2004-162913, it is easy to increase an outer diameter dimension of the roll processing surface portion 34 of the press roll 33, and it is easy to secure strength of the press roll 33. Further, it is possible to easily secure a space of a portion of the roll head 32 supporting the pair of support shaft portions 39 of the press roll 33, and it is possible to easily secure a degree of freedom in design of the manufacturing apparatus 28.

Second Embodiment

Figure 5:
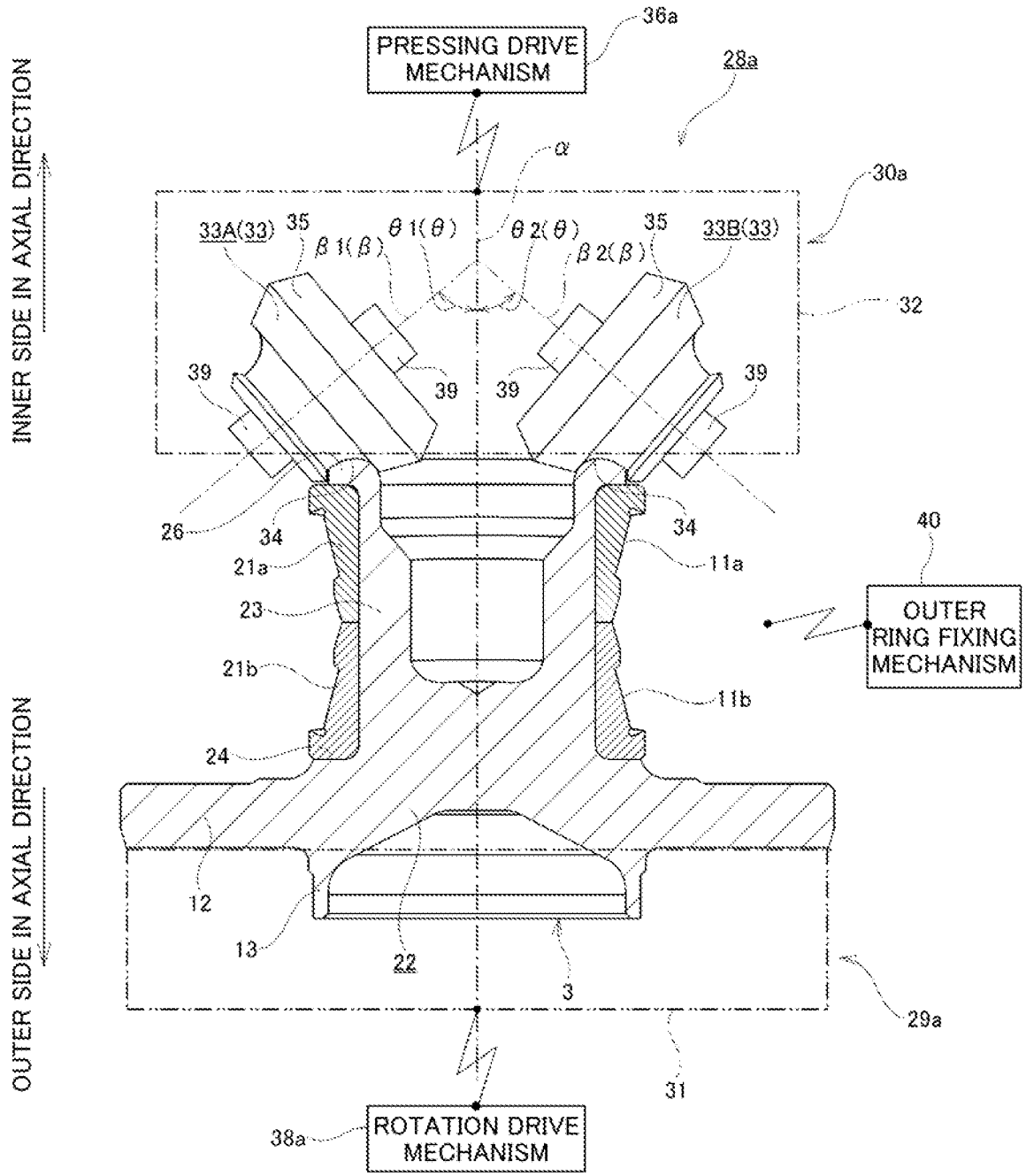
FIG. 5 is a view corresponding to FIG. 4 for another embodiment.

Another embodiment of the present invention will be described with reference to FIG. 5.

In the embodiment, in a hub unit bearing manufacturing apparatus 28a, a workpiece-side device 29a does not include the pressing drive mechanism 36 (see FIGS. 2 to 4), but instead includes a rotation drive mechanism 38a. The rotation drive mechanism 38a is, for example, a mechanism that uses an electric motor as a drive source and rotationally drives the support base 31 about the central axis α of the hub ring 22 (the central axis of the hub ring 22z (see FIG. 2)).

Further, the workpiece-side device 29a does not include the outer ring drive mechanism 37 (see FIGS. 2 to 4), but instead includes an outer ring fixing mechanism 40. The outer ring fixing mechanism 40 is a mechanism that prevents the outer ring 2 (see FIG. 1), which is not shown, from rotating when the staking portion 26 is formed.

Further, in an example, in the manufacturing apparatus 28*a*, a tool-side device 30*a* does not include the rotation drive mechanism 38 (see FIGS. 2 to 4), but instead includes a pressing drive mechanism 36*a*. The pressing drive mechanism 36*a* is a mechanism (a hydraulic mechanism) that uses a hydraulic pump as a drive source and moves the roll head 32 in the axial direction of the hub ring 22 (the axial direction of the hub ring 22*z*). Therefore, the pressing drive mechanism 36*a* can move each of the press rolls 33 supported by the roll head 32 in the axial direction of the hub ring 22.

In an example, when the staking portion 26 is formed by the manufacturing apparatus 28*a*, the support base 31 and the hub ring 22*z* are rotated by the rotation drive mechanism 38*a* about the central axis α of the hub ring 22*z*, and thus the hub ring 22*z* and each of the press rolls 33 are relatively rotated about the central axis of the hub ring 22*z*. Further, the roll head 32 is moved toward the outer side in the axial direction by the pressing drive mechanism 36*a*, and thus the roll processing surface portion 34 of each of the press roll 33 is pressed against the tubular portion 25 (see FIG. 3).

In the above example, a configuration in which the tool-side device 30*a* includes the pressing drive mechanism 36*a* that generates a force for pressing the roll processing surface portion 34 of each of the press rolls 33 against the tubular portion 25 is employed, but in a case in which the present invention is carried out, it is also possible to employ a configuration in which the workpiece-side device includes the pressing drive mechanism. Other configurations and effects are the same as in the first embodiment.

Third Embodiment

Figure 6:
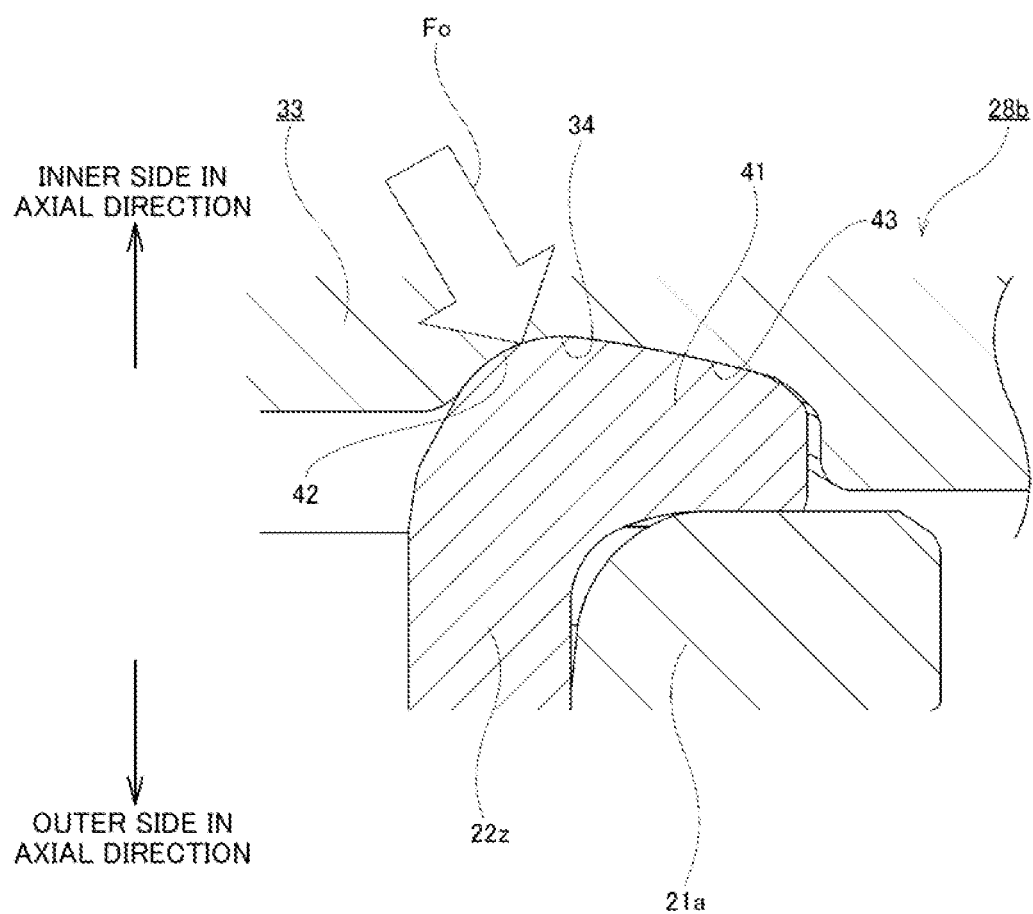
FIG. 6 is an enlarged cross-sectional view showing a contact portion between a staking portion intermediary body and a press roll in a first step of a forming operation of a staking portion according to still another embodiment.

Still another embodiment of the present invention will be described with reference to FIGS. 6 to 8.

In the embodiment, a hub unit bearing manufacturing apparatus 28*b* further includes a mechanism for changing positions and/or postures of the press rollers 33 in addition to the configuration of the hub unit bearing manufacturing apparatus 28 (or 28*a*) of the first embodiment (or the second embodiment). In an example, the manufacturing apparatus 28*b* includes the following configurations (1) and/or (2).

(1) A configuration in which each of the plurality of press rolls 33 is supported with respect to the roll head 32 to be adjustable in a position in the axial direction of the roll central axis β

(2) A configuration in which each of the plurality of press rolls 33 is supported with respect to the roll head 32 to be adjustable in an inclination angle θ of the roll central axis β with respect to the central axis α of the hub ring 22*z*

In an example, according to the hub unit bearing manufacturing apparatus 28*b*, a forming operation of the staking portion 26 can be divided into two steps (a first step and a second step) as follows.

In the first step, first, in the same manner as in the first embodiment (or the second embodiment), while a processing force Fo is applied from the roll processing surface portion 34 of each of the press rolls 33 to each of the two locations of the tubular portion 25 (see FIG. 3) at equal intervals in the circumferential direction toward the outer side in the axial direction and toward the outer side in the radial direction, a position where the processing force Fo is applied is continuously changed in the circumferential direction of the tubular portion 25. As a result, the tubular portion 25 is plastically deformed to be expanded toward the outer side in the radial direction while being crushed in the axial direction and to form a staking portion intermediary body 41, as shown in FIG. 6.

The staking portion intermediary body 41 has substantially the same shape as the staking portion 26 after completion. However, an axially outer side surface of the staking portion intermediary body 41 is slightly in contact with the end surface of the inner side inner ring 21*a* on the inner side in the axial direction to such an extent that the inner ring race 11*a* (see FIG. 7) on the inner side in the axial direction is not deformed, or is not in contact with the end surface of the inner side inner ring 21*a* on the inner side in the axial direction. That is, the staking portion intermediary body 41 has a shape in which the preload to the rolling elements 4*a* and 4*b* (see FIG. 1) does not change with the formation of the staking portion intermediary body 41.

At the time point at which the staking portion intermediary body 41 is formed as described above, the first step ends. Then, as shown in FIG. 7, each of the press rolls 33 is retracted in the axial direction of the hub ring 22*z* with respect to the staking portion intermediary body 41.

It is possible to check the timing at which the staking portion intermediary body 41 is formed by monitoring a value of a torque Ts for relatively rotating the two press rolls 33 and the hub ring 22*z* about the central axis α of the hub ring 22*z* (see FIG. 7), specifically, a value of a drive torque of the rotation drive mechanism 38 (see FIGS. 2 to 4) (a current value of the electric motor serving as the drive source), or a value of the drive torque of the rotation drive mechanism 38*a* (see FIG. 5) (a current value of the electric motor serving as the drive source). That is, since the value of the torque Ts changes according to the progress of processing of the tubular portion 25, if a relationship between the value of the torque Ts and the progress of processing of the tubular portion 25 is examined in advance, it is possible to check the timing at which the staking portion intermediary body 41 is formed by monitoring the value of the torque Ts using this relationship. In other words, it is possible to determine the time point at which the first step ends using the value of the torque Ts.

Figure 7:
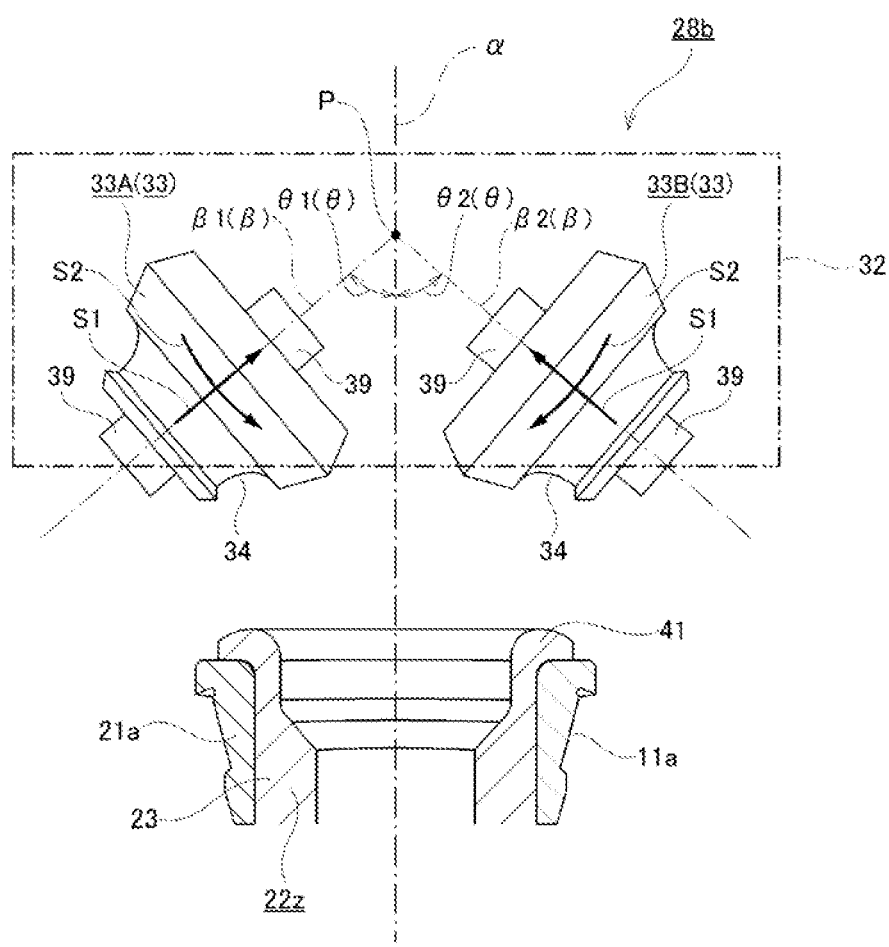
FIG. 7 is a partial cross-sectional view showing a state in which a plurality of press rolls are retracted in an axial direction with respect to the staking portion intermediary body after the first step of the forming operation of a staking portion ends.

In the second step, first, in a state shown in FIG. 7, each of the press rolls 33 is displaced with respect to the roll head 32 in a direction closer to the central axis α (a direction of arrow S1) by a predetermined amount (for example, 0.1 mm to several mm) in the axial direction of the roll central axis β (in a case in which the configuration of (1) above is provided). As a result, a position of the press roll 33 in an axial direction of the roll central axis β in the second step is disposed to be shifted closer to the central axis of the hub ring 22*z* than a position of the press roll 33 in the axial direction of the roll central axis β in the first step. Each of the press rolls 33 is swung with respect to the roll head 32 in a direction in which the inclination angle θ decreases (a direction of arrow S2) about an intersection P between the central axis α and the roll central axis β, and thus the inclination angle θ is reduced by a predetermined amount (for example, 1° to 15°) (in a case in which the configuration of (2) above is provided). That is, the inclination angle θ in the second step is made smaller than the inclination angle θ in the first step.

Figure 8:
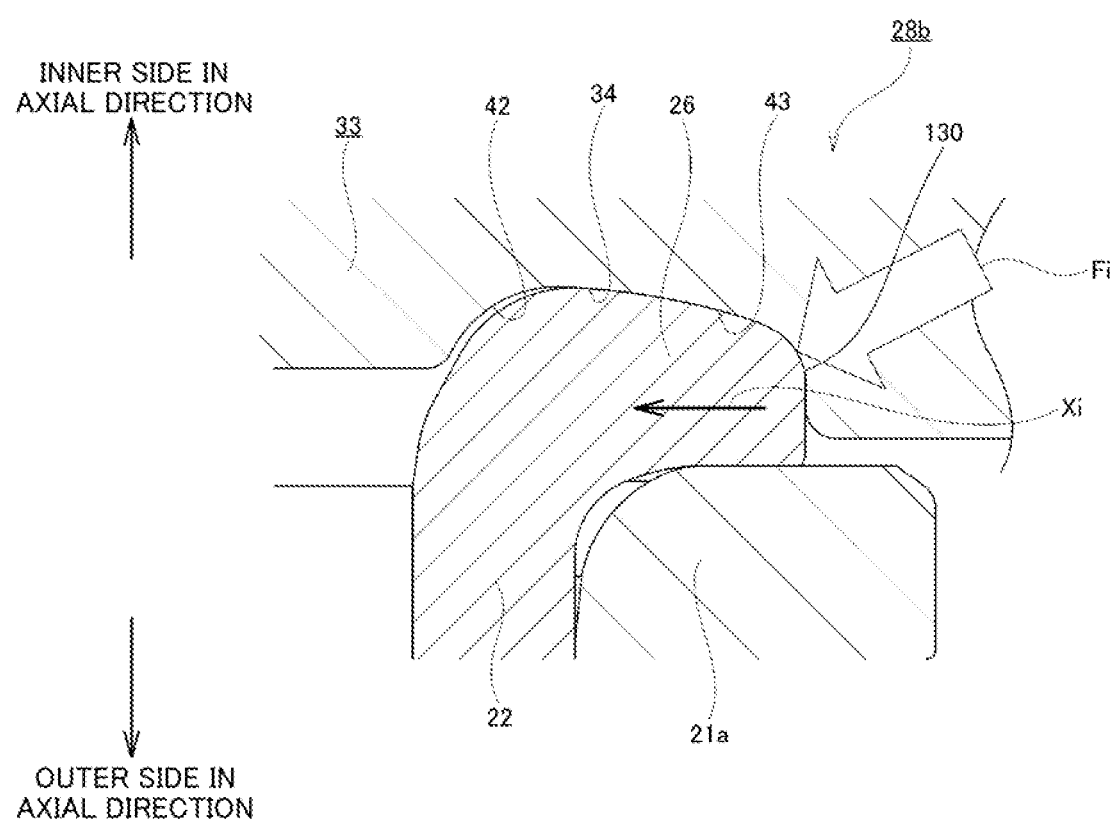
FIG. 8 is an enlarged cross-sectional view showing a contact portion between the staking portion and the press roll in a second step of the forming operation of a staking portion.

Then, in this state, as shown in FIGS. 7 and 8, each of the press rolls 33 is brought closer to the staking portion intermediary body 41 in the axial direction of the hub ring 22*z*, and thus the roll processing surface portion 34 of each of the press rolls 33 is pressed against the staking portion intermediary body 41. As a result, while a processing force Fi is applied from the roll processing surface portion 34 of each of the press rolls 33 to each of the two locations of the staking portion intermediary body 41 at equal intervals in the circumferential direction toward the outer side in the axial direction and toward the inner side in the radial direction, a position where the processing force Fi is applied is continuously changed in the circumferential direction of the staking portion intermediary body 41. The staking portion intermediary body 41 is plastically deformed to be pressed toward the inner side in the radial direction while being crushed in the axial direction and to form the staking portion 26. The hub ring 22 has the staking portion 26 with respect to the inner ring 21a, and the staking portion 26 is formed by deforming a shaft end of the hub ring 22 outward in the radial direction and has a deformed portion (a processed mark) 130 (FIG. 8) obtained by applying a load to a radially outer side part.

That is, in the present example, as described above, each of the press rolls 33 is displaced in the direction of arrow S1 by a predetermined amount, and/or each of the press rolls 33 is swung in the direction of arrow S2 to reduce the inclination angle θ by a predetermined amount. Therefore, a radially inner side portion 42 of the roll processing surface portion 34 does not come into contact with the staking portion intermediary body 41 (the staking portion 26) and only a radially outer side portion 43 of the roll processing surface portion 34 comes into contact with the staking portion intermediary body 41 (the staking portion 26) in a portion where the roll processing surface portion 34 and an axially inner side surface of the staking portion intermediary body 41 (the staking portion 26) come into contact with each other when the staking portion 26 is formed as shown in FIGS. 7 and 8. As a result, the processing force Fi that is directed toward the outer side in the axial direction and toward the inner side in the radial direction is applied from the roll processing surface portion 34 to the staking portion intermediary body 41 (the staking portion 26). In other words, in the present example, the amount of displacing each of the press rolls 33 in the direction of arrow S1 by a predetermined amount and/or the amount of swinging each of the press rolls 33 in the direction of arrow S2 to reduce the inclination angle θ by a predetermined amount is restricted such that only the radially outer side portion 43 of the roll processing surface portion 34 comes into contact with the staking portion intermediary body 41 (the staking portion 26) in a portion where the roll processing surface portion 34 and an axially inner side surface of the staking portion intermediary body 41 (the staking portion 26) come into contact with each other when the staking portion 26 is formed as shown in FIGS. 7 and 8. The first roller (the first press die) 33A has the radially inner side portion (a first processing surface portion) 42 and the radially outer side portion (a second processing surface portion) 43 disposed outward in the radial direction compared with the radially inner side portion (the first processing surface portion) 42. The second roller (the second press die) 33B has the radially inner side portion (a third processing surface portion) 42 and the radially outer side portion (a fourth processing surface portion) 43 disposed outward in the radial direction compared with the radially inner side portion (the third processing surface portion) 42. The positions and/or postures of the first roller 33A and the second roller 33B change such that a part of the radially outer side portion (the second processing surface portion) 43 of the first roller 33A and a part of the radially outer side portion (the fourth processing surface portion) 43 of the second roller 33B are close to each other (or are close to the reference axis α at the same time). In an example, in a state in which a part of the second processing surface portion 43 and a part of the fourth processing surface portion 43 face inward in the radial direction, the first roller 33A and the second roller 33B are displaced in the axial direction of the first rotation axis β1 and the second rotation axis β2, and thus, a part of the second processing surface portion 43 and a part of the fourth processing surface portion 43 are disposed at positions closer to the inner ring 21a (or the support base (base) 31) compared with the first processing surface portion 42 and the third processing surface portion 42 and move inward in the radial direction. In another example, in a state in which a part of the second processing surface portion 43 and a part of the fourth processing surface portion 43 face inward in the radial direction, the inclination angles of the first rotation axis β1 of the first roller 33A and the second rotation axis β2 of the second roller 33B with respect to the reference axis α are changed, and thus, a part of the second processing surface portion 43 and a part of the fourth processing surface portion 43 are disposed at positions closer to the inner ring 21a (or the support base (base) 31) compared with the first processing surface portion 42 and the third processing surface portion 42 and move inward in the radial direction.

In the present example in which the staking portion 26 is formed as described above, in the second step of the forming operation of the staking portion 26, the processing force Fi that is directed toward the outer side in the axial direction and toward the inner side in the radial direction (the load including a component that is directed toward the inner side in the radial direction) is applied to the staking portion 26 from the radially outer side portion 43 of the roll processing surface portion 34. Therefore, in the second step, the material of the staking portion 26 flows inward in the radial direction along the end surface of the inner side inner ring 21a on the inner side in the axial direction as shown by arrow Xi in FIG. 8. In the present example, at this time, the radially inner side portion 42 of the roll processing surface portion 34 and the staking portion 26 do not come into contact with each other, and a gap exists between the radially inner side portion 42 and the staking portion 26. Therefore, based on the existence of the gap, the flow of the material in the direction indicated by the arrow Xi described above can be easily generated. Then, in the present example, due to such a flow of the material, a force in a diameter reduction direction is applied to the end surface of the inner side inner ring 21a on the inner side in the axial direction. Therefore, in the present example, it is possible to prevent or suppress the expansion of the inner side inner ring 21a in a diameter expansion direction due to the formation of the staking portion 26. As a result, it is possible to prevent the inner side inner ring 21a from cracking and to suppress the variation in the preload due to the formation of the staking portion 26. As described above, in the present example, the step of forming the staking portion 26 includes the first step of applying the load including the load component this is directed outward in the radial direction to the hub ring 22 using the press rollers 33 to deform a part of the hub ring 22 outward in the radial direction and the second step of applying the load including the load component that is directed inward in the radial direction to the radially outer side part of the deformed part (the staking portion intermediary body (an intermediary staking portion) 41 of the hub ring 22 using the press rollers 33. In an example, at least one of the movements, positions and postures of the press rollers 33 differs from each other between the first step and the second step. In an example, the staking portion intermediary body (the intermediary staking portion) 41 is defined to have at least a partially deformed shaft end shape of the hub ring 22 in the first step. Alternatively, the staking portion intermediary body (the intermediary staking portion) 41 is defined to have a shaft end shape of the hub ring 22 at the time point at which the control of the outer shape is completed in the second step. For example, the staking portion intermediary body (the intermediary staking portion) 41 has a shaft end shape of the hub ring 22 at the time point at which the adjustment for the application of the load including the load component inward in the radial direction is completed. The adjusted load is constantly applied to the intermediary staking portion 41 to form the final staking portion 26. In an example, the staking portion intermediary body (the intermediary staking portion) 41 substantially does not come into contact with the inner ring 21a. In another example, the staking portion intermediary body (the intermediary staking portion) 41 substantially comes into contact with the inner ring 21a.

Other configurations and effects are the same as in the first embodiment or the second embodiment.

Figure 9:
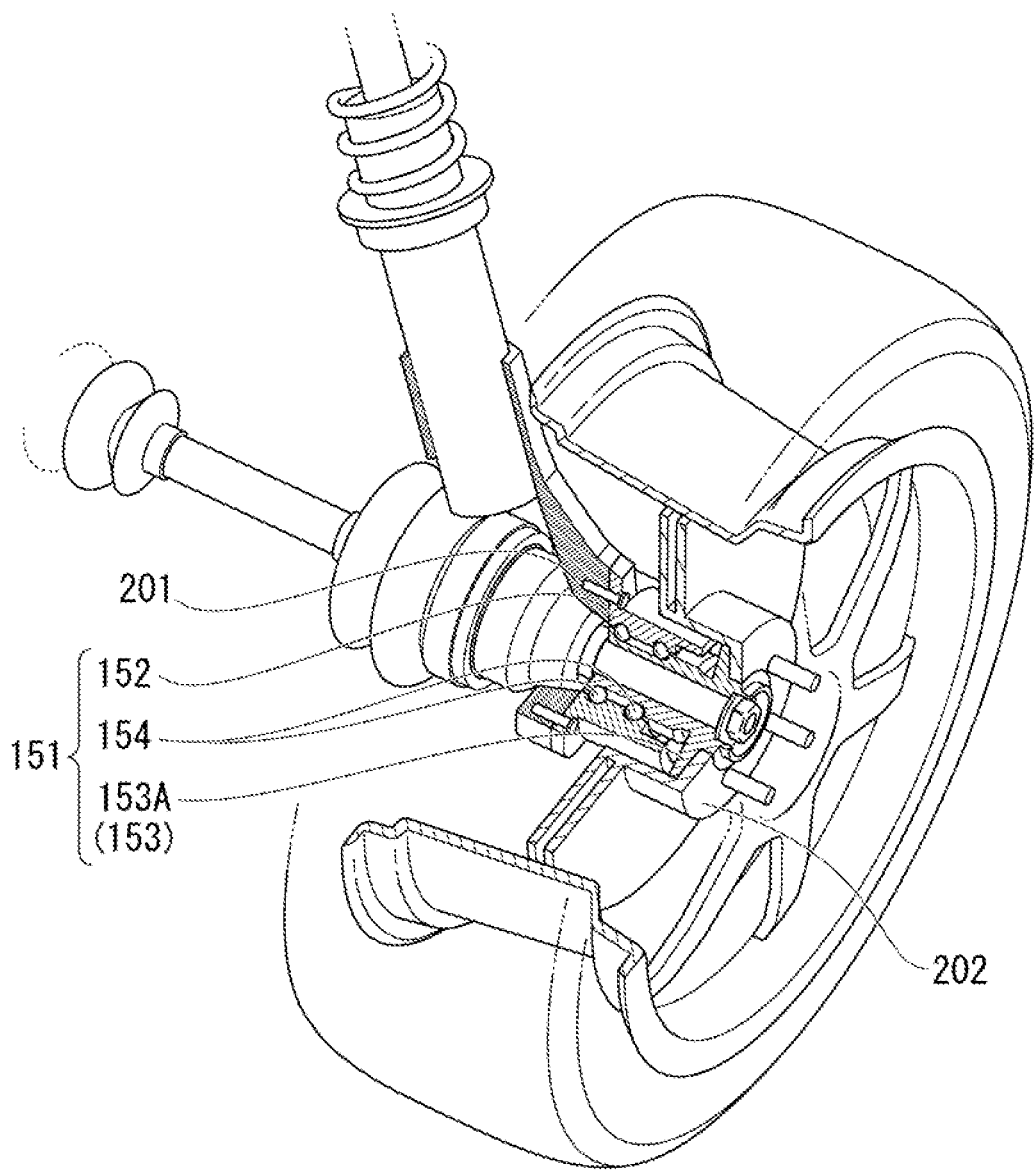
FIG. 9 is a partial schematic view of the vehicle including the hub unit bearing (a bearing unit).

FIG. 9 is a partial schematic view of a vehicle 200 including a hub unit bearing (a bearing unit) 151. The present invention can be applied to both a hub unit bearing for a drive wheel and a hub unit bearing for a driven wheel. In FIG. 9, the hub unit bearing 151 is for a drive wheel and includes an outer ring 152, a hub 153, and a plurality of rolling elements 154. The outer ring 152 is fixed to a knuckle 201 of a suspension apparatus using a bolt or the like. A wheel (and a rotating body for braking) 202 is fixed to a flange (a rotation flange) 153A provided in the hub 153 using a bolt or the like. Further, the vehicle 200 can have the same support structure as that described above for the hub unit bearing 151 for a driven wheel.

The present invention is not limited to the hub of the hub unit bearing and is also applicable to other bearing units (a staking assembly and a staking unit) in which the first member and the second member having a hole into which the first member is inserted are combined in the axial direction.

REFERENCE SIGNS LIST

1 Hub unit bearing (bearing unit)
2 Outer ring
3 Hub
4a, 4b Rolling element
5a, 5b Outer ring race
6 Stationary flange
7 Support hole
8 Knuckle
9 Through hole
10 Bolt
11a, 11b Inner ring race
12 Rotation flange
13 Pilot portion
14 Attachment hole
15 Stud
16 Rotation body for braking
17 Through hole
18 Wheel
19 Through hole
20 Nut
21a Inner ring (inner side inner ring)
21b Inner ring (outer side inner ring)
22, 22z Hub ring (hub main body)
23 Fitting shaft portion
24 Stepped surface
25 Tubular portion
26 Staking portion
27a, 27b Retainer
28, 28a, 28b Manufacturing apparatus
29, 29a Workpiece-side device
30, 30a Tool-side device
31 Support base
32 Roll head
33 Press roll
34 Roll processing surface portion
35 Roll main body
36, 36a Pressing drive mechanism
37 Outer ring drive mechanism
38, 38a Rotation drive mechanism
39, 39a, 39b Support shaft portion
40 Outer ring fixing mechanism
41 Staking portion intermediary body
42 Radially inner side portion
43 Radially outer side portion
44 First head
45 Second head
46a, 46b Bearing
47 Electric motor
48 Output shaft
49 Drive gear
50 Driven gear

What is claimed is:

1. A staking method for a bearing unit comprising:
preparing a first press die that has a first rotation axis, and a second press die that has a second rotation axis and is disposed apart from the first press die in a circumferential direction about a reference axis;
supporting a bearing unit in which a first member and a second member are combined in an axial direction on a base; and
pressing the first press die and the second press die against the bearing unit, including a first process and a second process, the first press die being disposed such that the first rotation axis is inclined with respect to the reference axis, the second press die being disposed such that the second rotation axis is inclined with respect to the reference axis,
wherein the first press die has a first processing surface portion and a second processing surface portion disposed outward in a radial direction compared with the first processing surface portion,
wherein the second press die has a third processing surface portion and a fourth processing surface portion disposed outward in a radial direction compared with the third processing surface portion,
wherein in the first process, the first processing surface portion and the third processing surface portion are pressed against the bearing unit, and
wherein in the second process, the second processing surface portion and the fourth processing surface portion are pressed against the bearing unit while the second processing surface portion and the fourth processing surface portion face inward in the radial direction.

2. The staking method for a bearing unit according to claim 1,
wherein of pressing includes moving the first press die and the second press die in the circumferential direction relative to the bearing unit.

3. The staking method for a bearing unit according to claim 1,
wherein positions and/or postures of the first press die and the second press die are changed in the second process such that a part of the second processing surface portion and a part of the fourth processing surface portion are closer to each other than in the first process.

4. The staking method for a bearing unit according to claim 1,
  wherein a third press die that has a third rotation axis and is disposed apart from the first press die and the second press die in the circumferential direction is further prepared, and
  wherein the pressing includes pressing the first press die disposed such that the first rotation axis is inclined with respect to the reference axis, the second press die disposed such that the second rotation axis is inclined with respect to the reference axis, and the third press die disposed such that the third rotation axis is inclined with respect to the reference axis against the bearing unit.

* * * * *